United States Patent
Long et al.

(10) Patent No.: US 11,894,898 B2
(45) Date of Patent: Feb. 6, 2024

(54) PHASE ERROR COMPENSATION FOR DOWNLINK SYSTEMS WITH FOUR CORRELATED AND UNCALIBRATED ANTENNAS

(71) Applicant: Telefonaktiebolaget LM Ericsson (publ), Stockholm (SE)

(72) Inventors: Jianguo Long, Kanata (CA); Shaohua Li, Kanata (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/770,785

(22) PCT Filed: Oct. 23, 2019

(86) PCT No.: PCT/IB2019/059078
§ 371 (c)(1),
(2) Date: Apr. 21, 2022

(87) PCT Pub. No.: WO2021/079173
PCT Pub. Date: Apr. 29, 2021

(65) Prior Publication Data
US 2022/0416862 A1    Dec. 29, 2022

(51) Int. Cl.
*H04B 7/06* (2006.01)
*H04B 17/10* (2015.01)
*H04B 7/10* (2017.01)

(52) U.S. Cl.
CPC ........... *H04B 7/0617* (2013.01); *H04B 7/063* (2013.01); *H04B 7/10* (2013.01); *H04B 17/102* (2015.01)

(58) Field of Classification Search
CPC .................................................. H04B 7/0617
(Continued)

(56) References Cited

U.S. PATENT DOCUMENTS

2015/0215023 A1    7/2015   Thurfjell
2017/0187109 A1*   6/2017   Wang ....................... H01Q 3/36
(Continued)

OTHER PUBLICATIONS

International Search Report and Written Opinion dated Apr. 1, 2020 for International Application No. PCT/IB2019/059078 filed Oct. 23, 2019, consisting of 14-pages.
(Continued)

*Primary Examiner* — Lihong Yu
(74) *Attorney, Agent, or Firm* — Christopher & Weisberg, P.A.

(57) ABSTRACT

A method, network node and wireless device for phase error compensation for Fifth Generation downlink systems with four correlated uncalibrated antennas are provided. A method includes applying N incremented phase rotations to one of the four antennas to produce N channel state information reference signal resources, N being an integer greater than 1. The method also includes transmitting N CSI-RS on 4 CSI-RS ports to a wireless device, WD, each of the N CSI-RS resources being transmitted with a different one of the incremented phase rotations. The method further includes receiving from the WD a CSI-RS resource indication that indicates a particular one of the N CSI-RS resources. The method also includes applying, in subsequent transmissions to the WD, a phase rotation to the one of the four antennas, the phase rotation corresponding to the indicated CSI-RS resource.

14 Claims, 8 Drawing Sheets

(58) Field of Classification Search
USPC .......................................................... 375/262
See application file for complete search history.

(56) References Cited

U.S. PATENT DOCUMENTS

2017/0234971 A1    8/2017  Arai
2018/0351621 A1*  12/2018  Wei ..................... H04B 7/0632
2021/0226676 A1*   7/2021  Gresset ............... H04W 72/046

OTHER PUBLICATIONS

3GPP TS 38.214 V15.4.0; 3rd Generation Partnership Project; Technical Specification Group Radio Access Network; NR; Physical layer procedures for data (Release 15); Dec. 2018, consisting of 102-pages.

* cited by examiner

PHASE ERROR COMPENSATION FOR DOWNLINK SYSTEMS WITH FOUR CORRELATED AND UNCALIBRATED ANTENNAS

CROSS-REFERENCE TO RELATED APPLICATIONS

This application is a Submission Under 35 U.S.C. § 371 for U.S. National Stage Patent Application of International Application Number: PCT/IB2019/059078, filed Oct. 23, 2022 entitled "PHASE ERROR COMPENSATION FOR DOWNLINK SYSTEMS WITH FOUR CORRELATED AND UNCALIBRATED ANTENNAS," the entirety of which is incorporated herein by reference.

TECHNICAL FIELD

Wireless communication and in particular, to phase error compensation for Fifth Generation (5G) downlink systems with four correlated and uncalibrated antennas.

BACKGROUND

Fifth Generation (5G) wireless networking, also referred to as New Radio (NR), is defined by wireless communication standards developed by the Third Generation Partnership Project (3GPP), and is replacing the extant Long Term Evolution (LTE) wireless standard. An example of a typical antenna system used in LTE, and likely to be used in NR low band, is depicted in FIG. 1. FIG. 1 shows 4 correlated downlink transmit antennas (numbered 0-3). The four antennas are cross-polarized, i.e., the antennas are either placed with a slant angle 45° (polarization A) or −45° (polarization B). Two cross-polarized antenna pairs are closely spaced with 0.5 to 1λ separation. An advantage of such a configuration is that it provides excellent beamforming gain because the co-polarized antennas (antenna pair 0 and 1 or antenna pair 2 and 3) are correlated; and at the same time, it also allows for reasonable multiplexing gain of up to 4 layers resulting from a combination of polarization diversity and sufficient spatial diversity.

Beamforming with correlated antennas requires that the phase difference between individual antenna elements be small. Any antenna error that affect phase relations could prevent systems from realizing full beamforming potential. Ideally, to achieve beamforming gain, the antennas shown in FIG. 1 should be calibrated. However, due to cost, most of 4 element antennas currently used in LTE base station (eNB) implementations are uncalibrated. As the wireless industry evolves into 5G, those radio-antenna systems will be reused. When antennas are uncalibrated, the signal over each antenna will have different phase ($\varphi_k$, k=0,1,2,3).

For each pair of correlated co-polarized antenna pair of FIG. 1, i.e., antenna pair 0 and 1 for polarization A or antenna pair 2 and 3 for polarization B, the main lobe of the radiation pattern or beam during transmission points in the direction where the phases of antenna signals are added constructively. Hence, beam direction depends on the phase difference between two co-polarized antennas. When the phase difference between two correlated antennas change, the beam direction will change as illustrated by FIG. 2.

The phase difference between antennas in each co-polarized antenna pair can be expressed approximately as:

$$\emptyset_A = \varphi_1 - \varphi_0$$

and $$\emptyset_B = \varphi_3 - \varphi_2$$

If the antennas are calibrated, i.e., $\varphi_k=0$ for all k=0,1,2,3, then $\emptyset_A = \emptyset_B = 0$ and the beams from two polarizations are aligned and point to bore sight, as illustrated by the dashed line in FIG. 2.

If the antennas are not calibrated, i.e., $\varphi_k \neq 0$ for all k=0,1,2,3, but the phase differences of two polarizations are the same, i.e., $\emptyset_A = \emptyset_B \neq 0$, the beams from two polarizations are still aligned while beam direction will be deviated from bore sight. For example, when $\emptyset_A = \emptyset_B$ #135% the beams of two polarizations can be illustrated by the solid line in FIG. 2.

However, when the phase difference from two beams are not equal, i.e., $\emptyset_A \neq \emptyset_B$, two beams will point to different directions. The example shown in FIG. 1 can be considered such as a case when $\emptyset_A=0°$ and $\emptyset_A=135$.

If the precoder codebook contains all combinations of phase compensations for the two co-polarized antenna pairs, this beam misalignment can be corrected by selecting a correct precoder. However, this is not the case for the NR type I codebook which assumes beams from two polarization always point to the same direction. Hence, for systems with four correlated and uncalibrated antennas, the NR type I codebook will have poor performance due to the beam misalignment caused by signal phase error.

The 5G NR type I codebook assumes beams from two polarizations always point to the same direction. However, this is not the case for systems with four correlated and uncalibrated antennas as phase error of antennas can cause beam misalignment. Performance will be poor when applying the NR type I codebook directly to systems with four correlated and uncalibrated antennas.

SUMMARY

Some embodiments advantageously provide a method, network node and wireless device for phase error compensation for Fifth Generation (5G) downlink systems with four correlated and uncalibrated antennas.

Some embodiments provide:

A method to introduce phase rotations to transmitted CSI-RS signals;

A method to detect the best quantized phase compensations for each WD in the systems by configuring the WD to report a CSI-RS resource indication (CRI) in a CSI report; and/or A method to apply phase compensation to downlink signals.

According to one aspect, a method in a network node for compensation of phase error between antennas of a four-antenna dual-polarization antenna array of a radio of the network node is provided. The method includes applying N incremented phase rotations to one of the four antennas to produce N channel state information reference signal (CSI-RS) resources, N being an integer greater than 1. The method further includes transmitting N CSI-RS on 4 CSI-RS ports to a wireless device, WD, each of the N CSI-RS resources being transmitted with a different one of the incremented phase rotations. The method also includes receiving from the WD a CSI-RS resource indication, CRI, indicating a particular one of the N CSI-RS resources. The method also includes applying, in subsequent transmissions to the WD, a phase rotation to the one of the four antennas, the phase rotation corresponding to the indicated CSI-RS resource.

According to this aspect, in some embodiments, the N incremented phase rotations are achieved by multiplying a precoder codebook by a diagonal matrix whose diagonal elements are equal to one, except for one diagonal element corresponding to the one of the four antennas and being equal to exp(j2πn/N), where n is an integer from zero to N−1. In some embodiments, each of N increments of the N incremented phase rotations are equal. In some embodiments, the particular one of the N CSI-RS resources is one having a highest spectrum efficiency of the N CSI-RS resources.

According to another aspect, a network node configured to compensate for phase error between antennas of a four-antenna dual-polarization antenna array of a radio of the network node is provided. The network node includes processing circuitry configured to apply N incremented phase rotations to one of the four antennas to produce N channel state information reference signal (CSI-RS) resources, N being an integer greater than 1. The network node also includes a radio interface in communication with the processing circuitry, the radio interface configured to: (1) transmit N CSI-RS on 4 CSI-RS ports to a wireless device, WD, each of the N CSI-RS resources being transmitted with a different one of the incremented phase rotations and (2) receive from the WD a CSI-RS resource indication, CRI, indicating a particular one of the N CSI-RS resources. In these embodiments, the processing circuitry is further configured to apply, in subsequent transmissions to the WD, a phase rotation to the one of the four antennas, the phase rotation corresponding to the indicated CSI-RS resource.

According to this aspect, in some embodiments, the N incremented phase rotations are achieved by multiplying a precoder codebook by a diagonal matrix whose diagonal elements are equal to one, except for one diagonal element corresponding to the one of the four antennas and being equal to exp(j2πn/N), where n is an integer from zero to N−1. In some embodiments, each of N increments of the N incremented phase rotations are equal. In some embodiments, the particular one of the N CSI-RS resources is one having a highest spectrum efficiency of the N CSI-RS resources.

According to yet another aspect, a method in a WD includes receiving a signal from a network node, the signal having N channel state information reference signals, CSI-RS, transmitted by a four-antenna dual polarization antenna array of a radio of the network node, the signal generated by the network node by applying N incremented phase rotations to one of the four antennas to produce N channel state information reference signal (CSI-RS) resources, N being an integer greater than 1. The method also includes determining a CSI-RS of N CSI-RS resulting in a highest spectrum efficiency of all the N CSI-RS, and transmitting to the network node a CSI resource indicator, CRI, indicating the determined CSI-RS resulting in the highest spectrum efficiency of all the N CSI-RS.

According to this aspect, in some embodiments, the WD further receives a signal configuring the WD to determine the CSI-RS with the highest spectrum efficiency of all the N CSI-RS received in the signal from the network node. In some embodiments, each increment of the N incremented phase rotations are equal. In some embodiments, the N incremented phase rotations are achieved by multiplying a precoder codebook by a diagonal matrix whose diagonal elements are equal to one, except for one diagonal element corresponding to one of the four antennas and being equal to exp(j2πn/N), where n is an integer from zero to N−1.

According to another aspect, a WD includes a radio interface configured to receive a signal from a network node, the signal having N channel state information reference signals, CSI-RS, transmitted by a four-antenna dual polarization antenna array of a radio of the network node, the signal generated by the network node by applying N incremented phase rotations to one of the four antennas to produce N channel state information reference signal (CSI-RS) resources, N being an integer greater than 1. The WD also includes processing circuitry in communication with the radio interface, the processing circuitry configured to determine a CSI-RS of the N CSI-RS resulting in a highest spectrum efficiency of all the N CSI-RS. The radio interface is further configured to transmit to the network node a CSI resource indicator, CRI, indicating the determined CSI-RS resulting in the highest spectrum efficiency of all the N CSI-RS.

According to this aspect, in some embodiments, the WD further receives a signal configuring the WD to determine the CSI-RS with the highest spectrum efficiency of all the N CSI-RS received in the signal from the network node. In some embodiments, each increment of the N incremented phase rotations are equal. In some embodiments, the N incremented phase rotations are achieved by multiplying a precoder codebook by a diagonal matrix whose diagonal elements are equal to one, except for one diagonal element corresponding to one of the four antennas and being equal to exp(j2πn/N), where n is an integer from zero to N−1.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
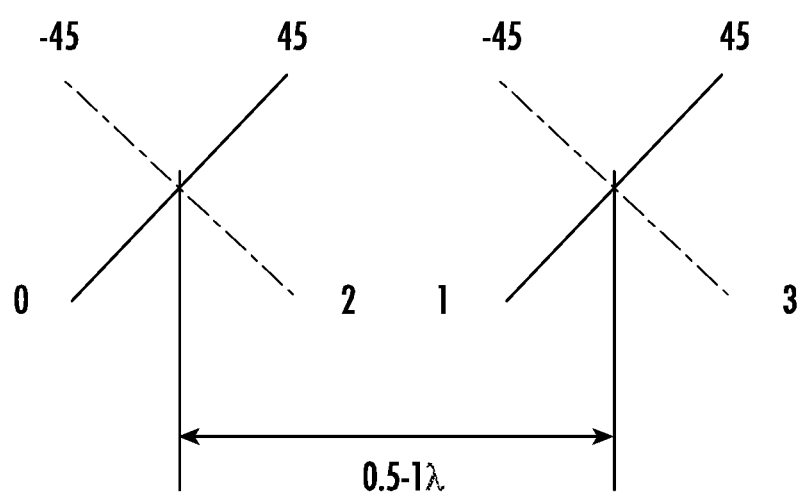
FIG. 1 depicts a four element cross polarized antenna.
Figure 2:
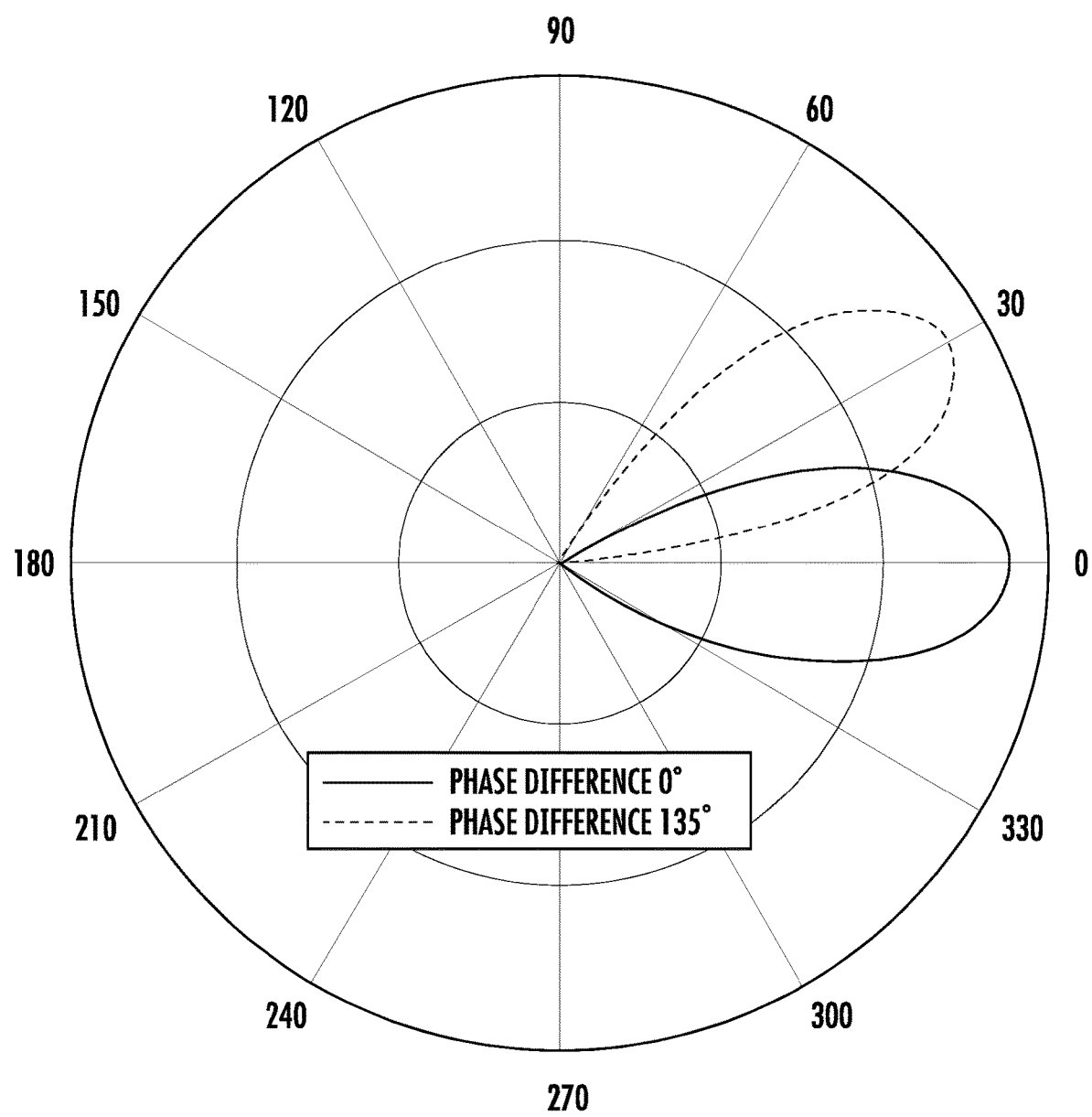
FIG. 2 depicts a beam pattern shown a result of phase error.

Before describing in detail exemplary embodiments, it is noted that the embodiments reside primarily in combinations of apparatus components and processing steps related to phase error compensation for Fifth Generation (5G) downlink systems with four correlated and uncalibrated antennas. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate, and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base radio interface station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base radio interface station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

As used herein, a "radio interface" may also be referred to as a radio, and may include an antenna array.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments are directed to phase error compensation for Fifth Generation (5G) downlink systems with four correlated and uncalibrated antennas. According to one aspect, a method includes applying N incremented phase rotations to one of the four antennas to produce N channel state information reference signal (CSI-RS) resources, N being an integer greater than 1. The method also includes transmitting N CSI-RS on 4 CSI-RS ports to a wireless device, WD, each of the N CSI-RS resources being transmitted with a different one of the incremented phase rotations. The method further includes receiving from the WD a CSI-RS resource indication, CRI, indicating which CSI-RS resource provides a highest spectrum efficiency of the N CSI-RS resources. The method also includes applying, in subsequent transmissions to the WD, a phase rotation to the one of the four antennas, the phase rotation corresponding to the indicated CSI-RS resource.

Figure 3:
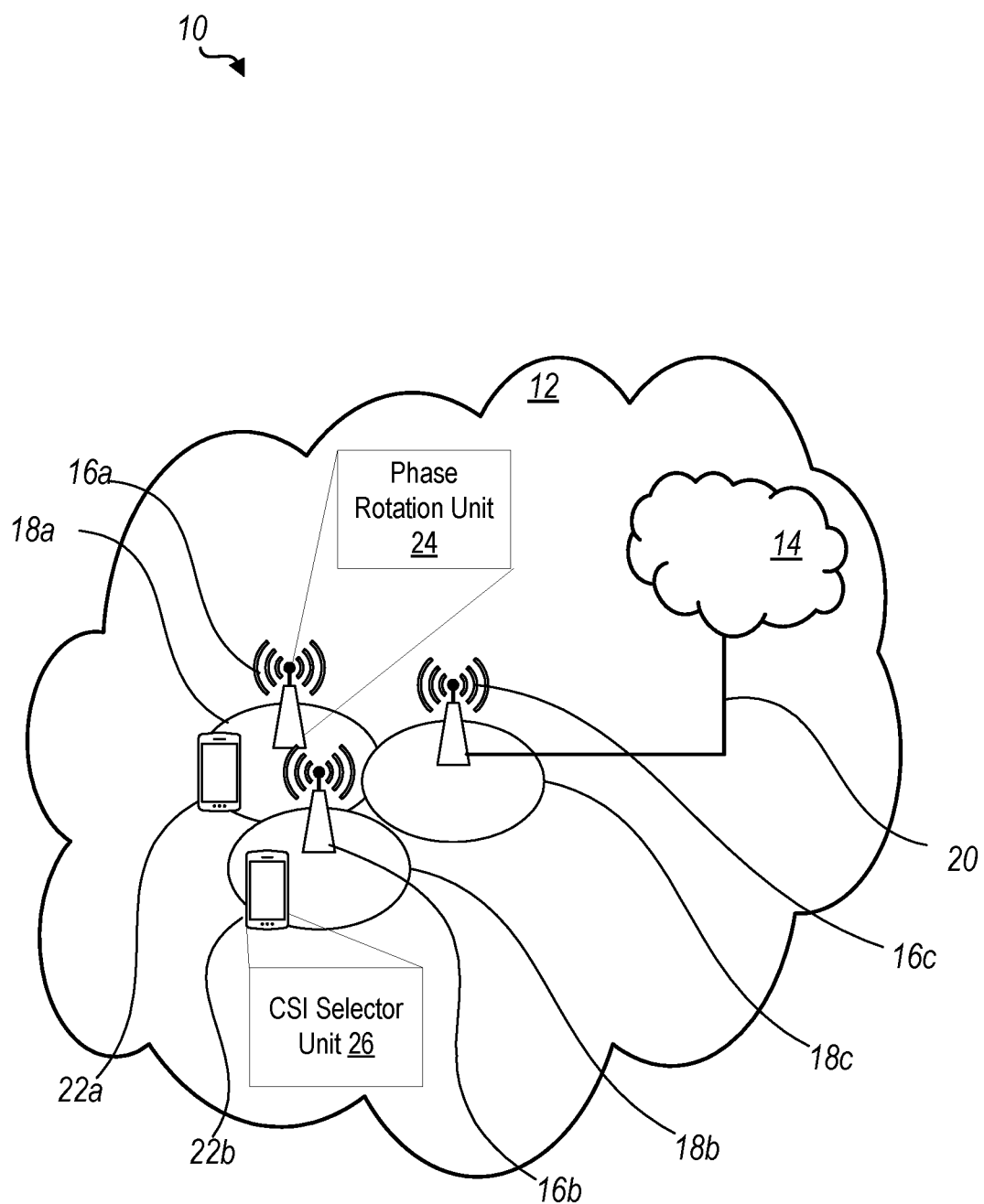
FIG. 3 is a schematic diagram of an exemplary network architecture illustrating a communication system according to the principles in the present disclosure.

Referring again to the drawing figures, in which like elements are referred to by like reference numerals, there is shown in FIG. 3 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NB s, eNB s, gNBs or other types of wireless access points, each defining a corresponding coverage area 18*a*, 18*b*, 18*c* (referred to collectively as coverage areas 18). Each network node 16*a*, 16*b*, 16*c* is connectable to the core network 14 over a wired or wireless connection 20. A first wireless device (WD) 22*a* located in coverage area 18*a* is configured to wirelessly connect to, or be paged by, the corresponding network node 16*a*. A second WD 22*b* in coverage area 18*b* is wirelessly connectable to the corresponding network node 16*b*. While a plurality of WDs 22*a*, 22*b* (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

A network node 16 (eNB or gNB) is configured to include a phase rotation unit 24 which is configured to applying N incremented phase rotations to one of the four antennas to produce N channel state information reference signal (CSI-RS) resources. A wireless device 22 is configured to include a CSI selector unit 26 which is configured to determining a CSI-RS of N CSI-RS resulting in a highest spectrum efficiency of all the N CSI-RS.

Example implementations, in accordance with an embodiment, of the WD 22 and, network node 16 discussed in the preceding paragraphs will now be described with reference to FIG. 4.

The communication system 10 includes a network node 16 including hardware 28 enabling it to communicate with the WD 22. The hardware 28 may include a radio interface 30 for setting up and maintaining at least a wireless connection 31 with a WD 22 located in a coverage area 18 served by the network node 16. The radio interface 30 may be formed as or may include, for example, one or more RF transmitters, one or more RF receivers, one of more RF transceivers and/or one or more RF radio interfaces. The radio interface 30 includes an array of antennas 32 to radiate and receive signal carrying electromagnetic waves. In example embodiments of this disclosure, the antenna array 32 has an array of 4 antenna elements, one example of which is 4 cross polarized antennas oriented as shown in FIG. 1.

In the embodiment shown, the hardware 28 of the network node 16 further includes processing circuitry 34. The processing circuitry 34 may include a memory 36 and a processor 38. In particular, in addition to or instead of a processor, such as a central processing unit, and memory, the processing circuitry 34 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 38 may be configured to access (e.g., write to and/or read from) the memory 36, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 40 stored internally in, for example, memory 36, or stored in external memory (e.g., database, storage array, network storage device, etc.) accessible by the network node 16 via an external connection. The software 40 may be executable by the processing circuitry 34. The processing circuitry 34 may be configured to control any of the methods and/or processes described herein and/or to cause such methods, and/or processes to be performed, e.g., by network node 16. Processor 38 corresponds to one or more processors 38 for performing network node 16 functions described herein. The memory 36 is configured to store data, programmatic software code and/or other information described herein. In some embodiments, the software 40 may include instructions that, when executed by the processor 38 and/or processing circuitry 34, causes the processor 38 and/or processing circuitry 34 to perform the processes described herein with respect to network node 16. For example, processing circuitry 34 of the network node 16 may include phase rotation unit 24 which is configured to applying N incremented phase rotations to one of the four antennas to produce N channel state information reference signal (CSI-RS) resources.

The communication system 10 further includes the WD 22 already referred to. The WD 22 may have hardware 42 that may include a radio interface 44 configured to set up and maintain a wireless connection 31 with a network node 16 serving a coverage area 18 in which the WD 22 is currently located. The radio interface 44 may be formed as or may include, for example, one or more RF transmitters, one or more RF receivers, one or more RF transceivers and/or one or more RF radio interfaces. The radio interface 44 includes an array of antennas 46 to radiate and receive signal carrying electromagnetic waves. The array of antennas 46 of the WD 22 may have 4 antenna elements or fewer or greater than 4 antenna elements.

The hardware 60 of the WD 22 further includes processing circuitry 48. The processing circuitry 48 may include a memory 50 and a processor 52. In particular, in addition to or instead of a processor, such as a central processing unit, and memory, the processing circuitry 48 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 52 may be configured to access (e.g., write to and/or read from) memory 50, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 54, which is stored in, for example, memory 50 at the WD 22, or stored in external memory (e.g., database, storage array, network storage device, etc.) accessible by the WD 22. The software 54 may be executable by the processing circuitry 48. The software 54 may include a client application 56. The client application 56 may be operable to provide a service to a human or non-human user via the WD 22.

The processing circuitry 48 may be configured to control any of the methods and/or processes described herein and/or to cause such methods, and/or processes to be performed, e.g., by WD 22. The processor 52 corresponds to one or more processors 52 for performing WD 22 functions described herein. The WD 22 includes memory 50 that is configured to store data, programmatic software code and/or other information described herein. In some embodiments, the software 54 and/or the client application 56 may include instructions that, when executed by the processor 52 and/or processing circuitry 48, causes the processor 52 and/or processing circuitry 48 to perform the processes described herein with respect to WD 22. For example, the processing circuitry 48 of the wireless device 22 may include CSI selector unit 26 which is configured to determining a CSI-RS of N CSI-RS resulting in a highest spectrum efficiency of all the N CSI-RS.

Figure 4:
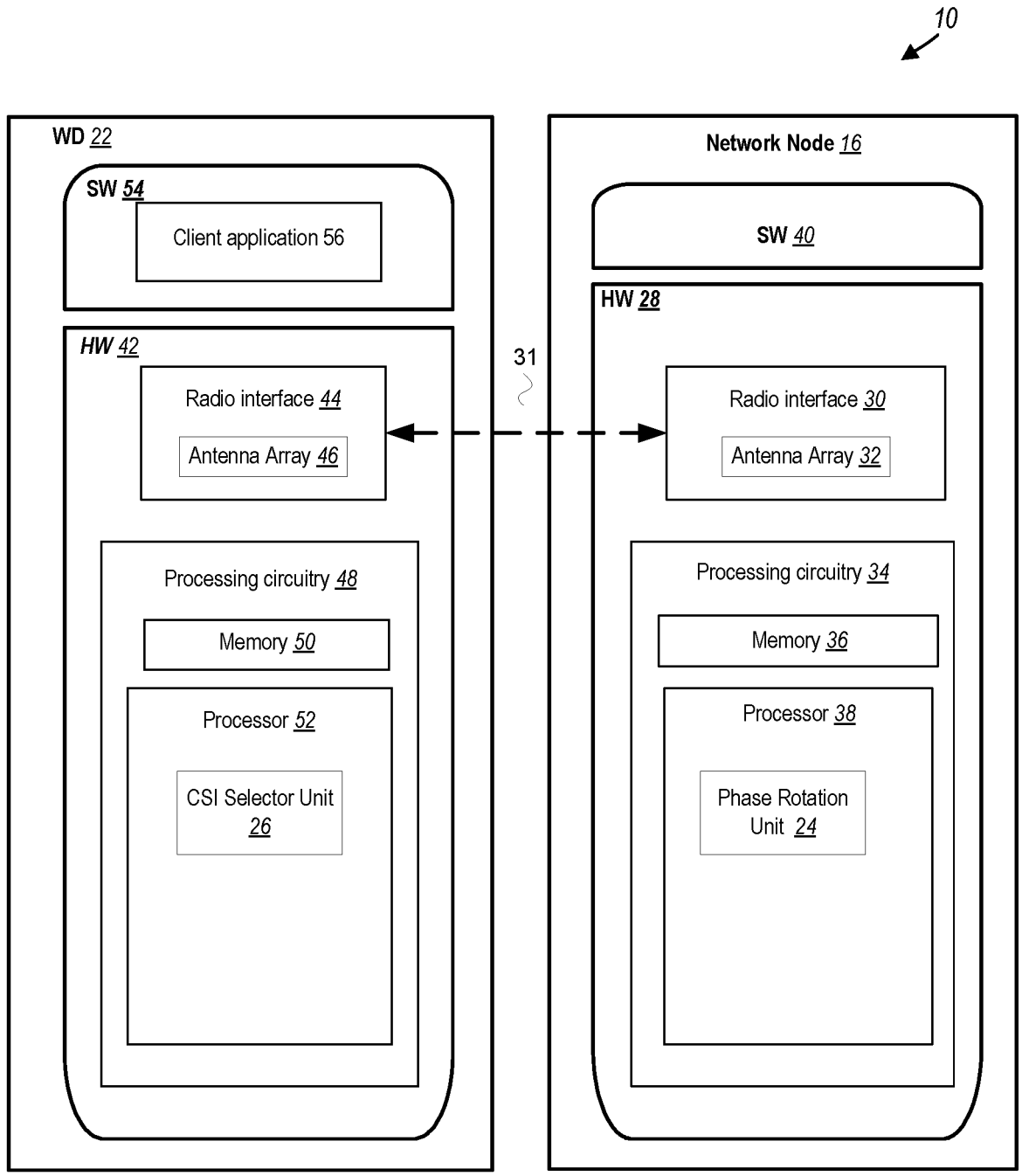
FIG. 4 is a block diagram of a network node in communication with a wireless device over a wireless connection according to some embodiments of the present disclosure.

In some embodiments, the inner workings of the network node 16 and WD 22 may be as shown in FIG. 4 and independently, the surrounding network topology may be that of FIG. 3.

The wireless connection 31 between the WD 22 and the network node 16 is in accordance with the teachings of the embodiments described throughout this disclosure. More precisely, the teachings of some of these embodiments may improve the data rate, latency, and/or power consumption and thereby provide benefits such as reduced user waiting time, relaxed restriction on file size, better responsiveness, extended battery lifetime, etc. In some embodiments, a measurement procedure may be provided for the purpose of monitoring data rate, latency and other factors on which the one or more embodiments improve.

Although FIGS. 3 and 4 show various "units" such as phase rotation unit 24 and CSI selector unit 26 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 5:
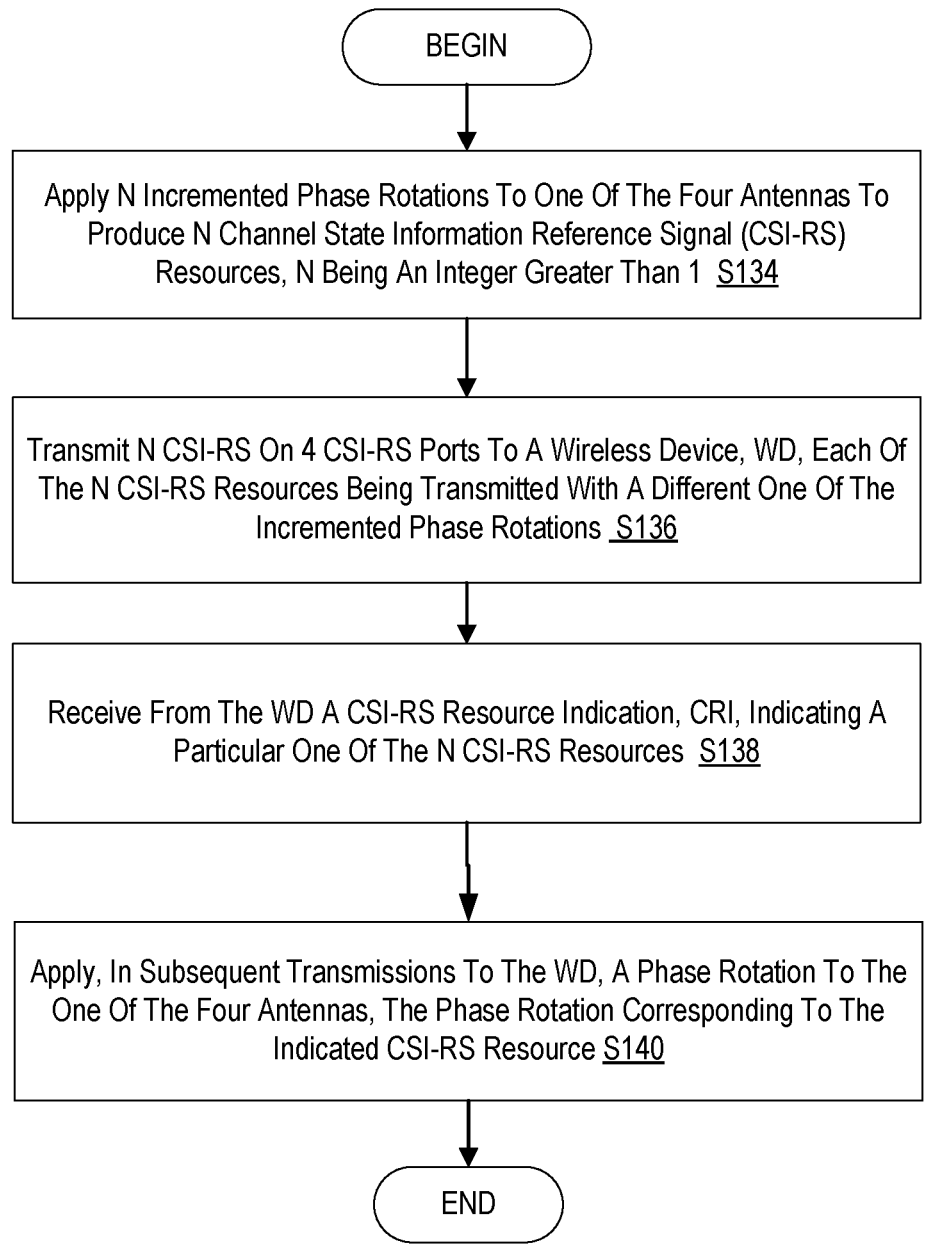
FIG. 5 is a flowchart of an exemplary process in a network node for phase error compensation for Fifth Generation (5G) downlink systems with four correlated and uncalibrated antennas.

FIG. 5 is a flowchart of an exemplary process in a network node 16 for phase error compensation for Fifth Generation (5G) downlink systems with four correlated and uncalibrated antennas. One or more blocks described herein may be performed by one or more elements of network node 16 such as by one or more of processing circuitry 34 (including the phase rotation unit 24), processor 38, and/or radio interface 30. Network node 16 such as via processing circuitry 34 and/or processor 38 and/or radio interface 30 is configured to apply N incremented phase rotations to one of the four antennas to produce N channel state information reference signal (CSI-RS) resources, N being an integer greater than 1 (Block S134). The process includes transmitting N CSI-RS on 4 CSI-RS ports to a wireless device, WD, each of the N CSI-RS resources being transmitted with a different one of the incremented phase rotations (Block S136). The process includes receiving from the WD a CSI-RS resource indication, CRI, indicating a particular one of the N CSI-RS resources (Block S138). The process also includes applying, in subsequent transmissions to the WD, a phase rotation to the one of the four antennas, the phase rotation corresponding to the indicated CSI-RS resource (Block S140).

Figure 6:
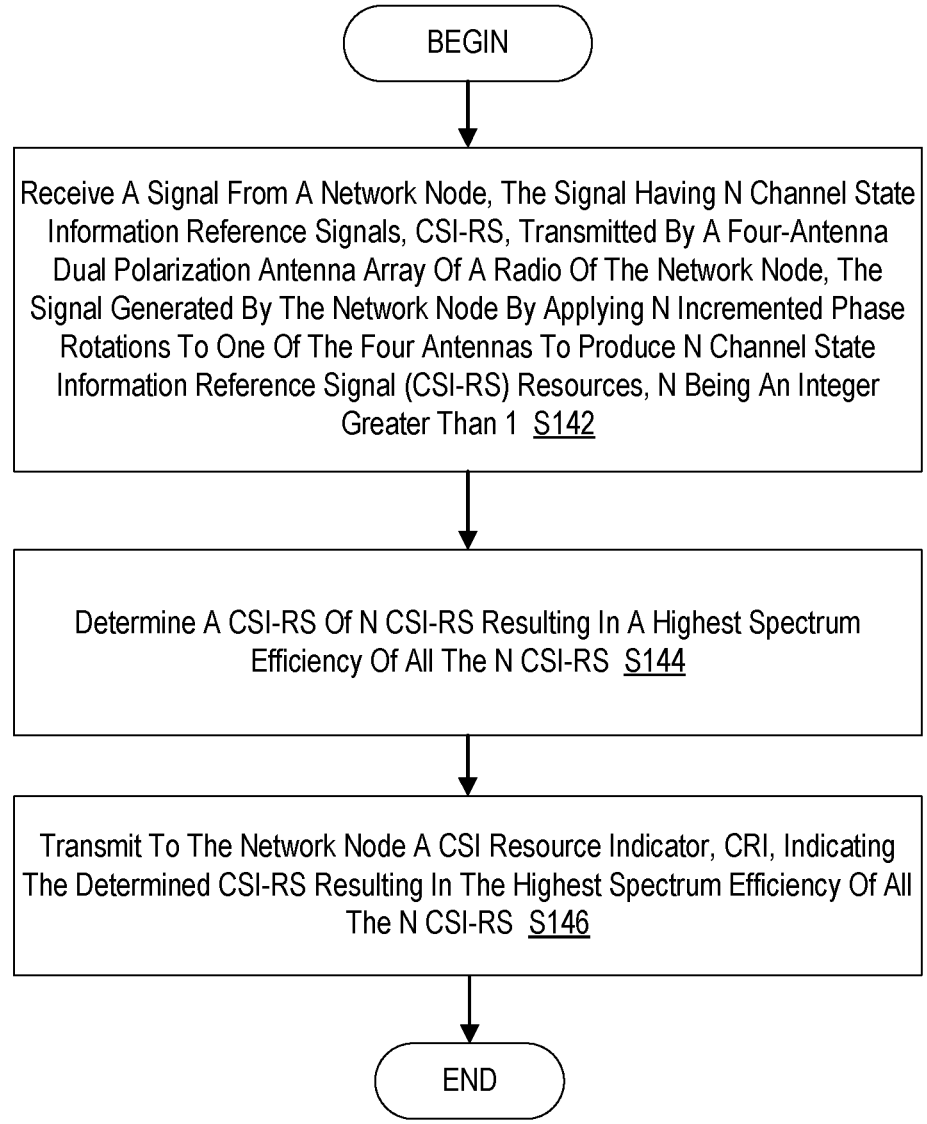
FIG. 6 is a flowchart of an exemplary process in a wireless device for phase error compensation for Fifth Generation (5G) downlink systems with four correlated and uncalibrated antennas.

FIG. 6 is a flowchart of an exemplary process in a wireless device 22 according to some embodiments of the present disclosure. One or more blocks described herein may be performed by one or more elements of wireless device 22 such as by one or more of processing circuitry 48 (including the CSI selector unit 26), processor 52 and/or radio interface 44. Wireless device 22 such as via processing circuitry 48 and/or processor 52 and/or radio interface 44 is configured to receive a signal from a network node, the signal having N channel state information reference signals, CSI-RS, transmitted by a four-antenna dual polarization antenna array of a radio of the network node, the signal generated by the network node by applying N incremented phase rotations to one of the four antennas to produce N channel state information reference signal (CSI-RS) resources, N being an integer greater than 1 (Block S142). The process also includes determining a CSI-RS of N CSI-RS resulting in a highest spectrum efficiency of all the N CSI-RS (Block S144). The process further includes transmitting to the network node a CSI resource indicator, CRI, indicating the determined CSI-RS resulting in the highest spectrum efficiency of all the N CSI-RS (Bloc S146).

Figure 7:
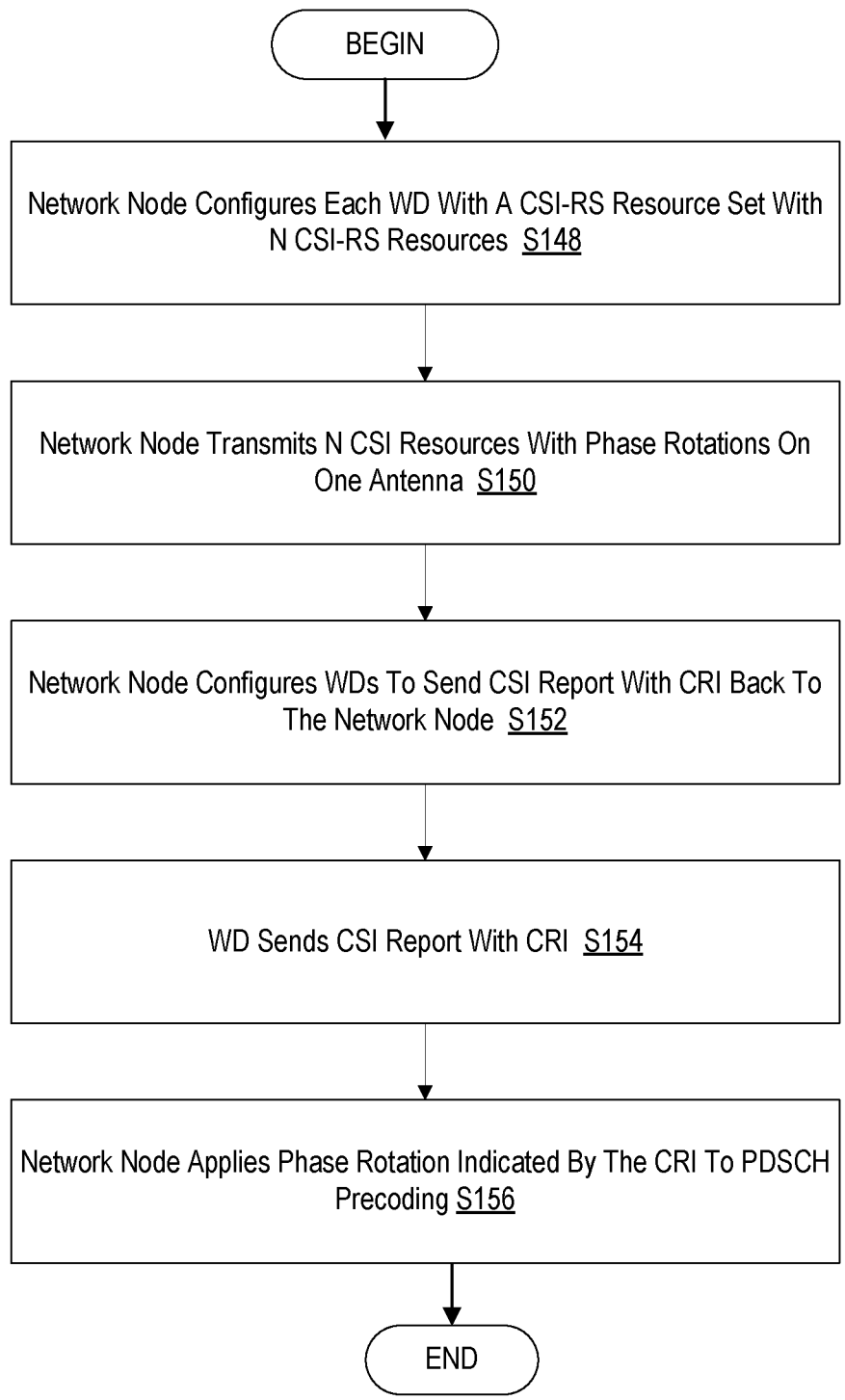
FIG. 7 is a flowchart of an exemplary process for phase error compensation for Fifth Generation (5G) downlink systems with four correlated and uncalibrated antennas.

FIG. 7 is flowchart of an exemplary process involving both wireless device 22 and network node 16. The network node 16 configures each WD 22 with a CSI-RS resource set with N CSI-RS resources (Block S148). The network node 16 transmits, via the radio interface 30, N CSI resources with phase rotations on one antenna (Block S150). The network node 16 configures WDs to send CSI report with CRI back to the network node 16 (Block S152). WD 22 sends CSI report with CRI (Block S154). The network node 16, via processing circuitry 34, applies phase rotation indicated by the CRI to PDSCH precoding (Block S156).

Having described the general process flow of arrangements of the disclosure and having provided examples of hardware and software arrangements for implementing the processes and functions of the disclosure, the sections below provide details and examples of arrangements for phase error compensation for Fifth Generation (5G) downlink systems with four correlated and uncalibrated antennas.

5G NR Type I Codebook

The NR type 1 codebook specified by the 3GPP is based on a set of pre-defined precoding matrices. The precoding matrix, denoted as W, can be described as a two-stage precoding structure as follows:

$$W = W_1 W_2. \tag{1}$$

The first stage of the precoding structure, i.e., $W_1$, may be described as a codebook, and consists essentially of a group of a two dimensional (2D) grid-of-beams (GoB), which may be characterized as:

$$W_1 = \begin{bmatrix} w_h \otimes w_v & 0 \\ 0 & w_h \otimes w_v \end{bmatrix},$$

where $w_h$ and $w_v$ are precoding vectors selected from an over-sampled discrete Fourier transform (DFT) for the horizontal direction and the vertical direction, respectively. The precoding vectors may be expressed by:

$$w_v = \frac{1}{\sqrt{M}} \left[ 1, e^{j\frac{2\pi v}{MO_1}}, \ldots, e^{j\frac{2\pi mv}{MO_1}}, \ldots, e^{j\frac{2\pi(M-1)v}{MO_1}} \right]^T,$$

$$w_h = \frac{1}{\sqrt{N}} \left[ 1, e^{j\frac{2\pi h}{NO_2}}, \ldots, e^{j\frac{2\pi nv}{NO_2}}, \ldots, e^{j\frac{2\pi(N-1)h}{NO_2}} \right]^T,$$

where $O_1$ and $O_2$ are the over-sampling rate in vertical and horizontal directions, respectively.

For 4 CSI-RS ports:

$$w_v = 1$$

$$w_h(l) = \left[ 1 \quad e^{j\frac{2\pi l}{O_1 N_1}} \right]^T = \left[ 1 \quad e^{j\frac{\pi l}{4}} \right]^T, l = 0, 1, \ldots, 7$$

$$W_1(l) = \begin{bmatrix} w_h(l) & 0 \\ 0 & w_h(l) \end{bmatrix},$$

The second stage of the precoding matrix, i.e., $W_2$, is used for beam selection within the group of the 2D GoB as well as the associated co-phasing between two polarizations. The co-phasing vector for one layer is defined as:

$$W_2(n) = \begin{bmatrix} 1 \\ \varphi_n \end{bmatrix}, \varphi_n = e^{j\frac{\pi n}{2}}, n = 0, 1, 2, 3$$

The precoder matrix for one-layer transmission may be created by appending columns of one layer precoder vectors is defined as:

$$W(l, n) = W_1(l)W_2(n) = \begin{bmatrix} w_h(l) & 0 \\ 0 & w_h(l) \end{bmatrix} \begin{bmatrix} 1 \\ \varphi_n \end{bmatrix}.$$

The precoder matrix for multi-layer transmission may be created by appending columns of one layer precoder vectors as:

$$W = [W(l_0, n_0) W(l_1, n_1) \ldots W(l_{L-1}, n_{L-1})]$$

where L is the number of layers.

The co-phasing vector does not change the phase difference between co-polarized antennas. The NR type I codebook assumes that the beams of two polarizations point to the same direction.

Phase Compensation

In case $\emptyset_A \neq \emptyset_B$, a phase rotation can be applied to one of the 4 antennas of the antenna array 32 to make the beams of two polarizations aligned. Without loss of generality, hereafter it is assumed that a phase rotation $\Delta\varphi_3$ is applied to antenna number 3 of the 4 antennas, such as shown in FIG. 1:

$$\widehat{\varphi_3} = \varphi_3 + \Delta\varphi_3$$

$$\widehat{\emptyset_B} = \varphi_2 - \varphi_3 - \Delta\emptyset_3 = \emptyset_B - \Delta\varphi_3$$

$$\emptyset_A = \widehat{\emptyset_B} = \emptyset_B \cdot \Delta\varphi_3$$

The phase rotation $\Delta\varphi_3$ to make $\emptyset_A$ and $\widehat{\emptyset_B}$ equal is:

$$\Delta\varphi_3 = \emptyset_B - \emptyset_A$$

If the phase rotation $\Delta\varphi_3$ can be accurately measured, then this phase error can be compensated by applying to a CSI-RS with the following port-to-antenna mapping matrix:

$$W_{p2a} = \text{diag}(1,1,1,e^{j\Delta\varphi_3}),$$

so that the WD 22 can report CSI such as for example via its own radio interface 44 to the network node 16, based on compensated CSI-RS signals. The physical downlink shared channel (PDSCH) beamforming weights may also be phase compensated based on the WD-reported rank indicator precoder matrix indicator (RI/PMI) and phase compensated CSI-RS:

$$W_{PDSCH} = W_{p2a} W_{PM1}$$

Note that $W_{PM1}$ is the 3GPP defined NR type 1 codebook. Hence the PDSCH precoder disclosed above can be considered as an enhancement to the NR codebook for phase compensation.

Accurate phase error measurement and compensation can be done by antenna calibration which requires additional hardware and signaling and consequently higher cost. The solution described here is a low cost solution which measures and compensates the phase error by software so that the phase error is smaller than a predefined threshold.

Define a series of N equally incremented phase rotations to be applied to any of the four antennas of antenna array 32, the phase rotations being, for example, n=0,1, . . . , N−1. Again, without loss of generality, these phase rotations may, once again, be applied to antenna 3 of the 4 element antenna array 32 as mentioned above.

To identify the optimal phase compensation $e^{j2\pi n/N}$, $n \in \{0, 1, \ldots, N-1\}$, N CSI-RS resources of 4 CSI-RS ports will be transmitted. The CSI-RS resource n will be transmitted with a phase rotation $e^{j2\pi n/N}$ on the antenna 3 by using following port-to-antenna mapping for CSI-RS.

$$W_{p2a}(n) = \text{diag}(1,1,1,e^{j2\pi n/N}), n=0,1, \ldots, N-1$$

Figure 8:
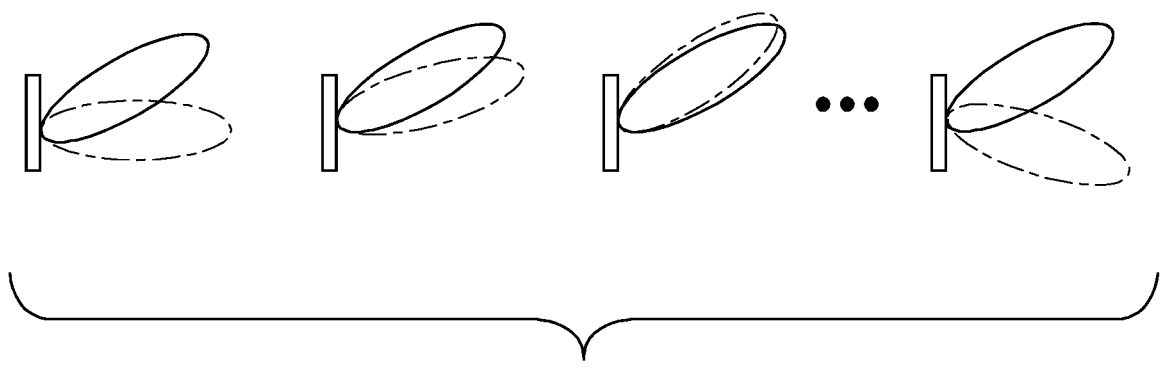
FIG. 8 is a diagram depicting beam patterns for successive CSI-RS.

The beam direction of polarization B with each phase rotation will change as illustrated by FIG. 8. Note that FIG. 8 is an example only, and embodiments are not limited to achieving the beam patterns shown in FIG. 8.

The WD 22 will be configured to send a CSI report with the CSI-RS resource indication (CRI) which indicates the CSI-RS resource providing the highest spectrum efficiency $C_{max}$, i.e., the CSI-RS resource beamformed with the best $W_{p2a}$:

$$CRI = \max_{n \in \{0,1, \ldots, N-1\}} C(W_{p2a}(n))$$

Thus, according to one aspect, a method in a network node 16 for compensation of phase error between antennas of a four-antenna dual-polarization antenna array of a radio of the network node 16 is provided. The method includes applying, via the processing circuitry 34, N incremented phase rotations to one of the four antennas to produce N channel state information reference signal (CSI-RS) resources, N being an integer greater than 1. The method further includes transmitting, via the radio interface 30, N CSI-RS on 4 CSI-RS ports to a wireless device, WD 22, each of the N CSI-RS resources being transmitted with a different one of the incremented phase rotations. The method also includes receiving, via the radio interface 30, from the WD 22 a CSI-RS resource indication, CRI, indicating a particular one of the N CSI-RS resources. The method also includes applying, via the processing circuitry 34, in subsequent transmissions to the WD 22, a phase rotation to the one of the four antennas, the phase rotation corresponding to the indicated CSI-RS resource.

According to this aspect, in some embodiments, the N incremented phase rotations are achieved by multiplying, via the processing circuitry 34, a precoder codebook by a diagonal matrix whose diagonal elements are equal to one, except for one diagonal element corresponding to the one of the four antennas and being equal to exp(j2πn/N), where n is an integer from zero to N−1. In some embodiments, each of N increments of the N incremented phase rotations are equal. In some embodiments, the particular one of the N CSI-RS resources is one having a highest spectrum efficiency of the N CSI-RS resources.

According to another aspect, a network node 16 configured to compensate for phase error between antennas of a four-antenna dual-polarization antenna array 43 of a radio of the network node 16 is provided. The network node 16 includes processing circuitry 34 configured to apply N incremented phase rotations to one of the four antennas to produce N channel state information reference signal (CSI-RS) resources, N being an integer greater than 1. The network node 16 also includes a radio interface 30 in communication with the processing circuitry, the radio interface 30 configured to: (1) transmit N CSI-RS on 4 CSI-RS ports to a wireless device, WD 22, each of the N CSI-RS resources being transmitted with a different one of the incremented phase rotations and (2) receive from the WD 22 a CSI-RS resource indication, CRI, indicating a particular one of the N CSI-RS resources. In these embodiments, the processing circuitry 34 is further configured to apply, in subsequent transmissions to the WD 22, a phase rotation to the one of the four antennas, the phase rotation corresponding to the indicated CSI-RS resource.

According to this aspect, in some embodiments, the N incremented phase rotations are achieved by multiplying, via the processing circuitry 34, a precoder codebook by a diagonal matrix whose diagonal elements are equal to one, except for one diagonal element corresponding to the one of the four antennas and being equal to $\exp(j2\pi n/N)$, where n is an integer from zero to N−1. In some embodiments, each of N increments of the N incremented phase rotations are equal. In some embodiments, the particular one of the N CSI-RS resources is one having a highest spectrum efficiency of the N CSI-RS resources.

According to yet another aspect, a method in a WD 22 includes receiving, via the radio interface 44, a signal from a network node 16, the signal having N channel state information reference signals, CSI-RS, transmitted by a four-antenna dual polarization antenna array 32 of a radio interface 30 of the network node 16, the signal generated by the network node 16 by applying N incremented phase rotations to one of the four antennas of the antenna array 32 to produce N channel state information reference signal (CSI-RS) resources, N being an integer greater than 1. The method also includes determining, via the processing circuitry 48, a CSI-RS of N CSI-RS resulting in a highest spectrum efficiency of all the N CSI-RS, and transmitting, via the radio interface 44, to the network node 16 a CSI resource indicator, CRI, indicating the determined CSI-RS resulting in the highest spectrum efficiency of all the N CSI-RS.

According to this aspect, in some embodiments, the WD 22 further receives, via the radio interface 44, a signal configuring the WD 22 to determine the CSI-RS with the highest spectrum efficiency of all the N CSI-RS received in the signal from the network node 16. In some embodiments, each increment of the N incremented phase rotations are equal. In some embodiments, the N incremented phase rotations are achieved by multiplying, via the processing circuitry 48, a precoder codebook by a diagonal matrix whose diagonal elements are equal to one, except for one diagonal element corresponding to one of the four antennas and being equal to $\exp(j2\pi n/N)$, where n is an integer from zero to N−1.

According to another aspect, a WD 22 includes a radio interface 44 configured to receive a signal from a network node 16, the signal having N channel state information reference signals, CSI-RS, transmitted by a four-antenna dual polarization antenna array 32 of the radio interface 30 of the network node 16, the signal generated by the network node 16 by applying N incremented phase rotations to one of the four antennas to produce N channel state information reference signal (CSI-RS) resources, N being an integer greater than 1. The WD 22 also includes processing circuitry 48 in communication with the radio interface 44, the processing circuitry 48 configured to determine a CSI-RS of the N CSI-RS resulting in a highest spectrum efficiency of all the N CSI-RS. The radio interface 44 is further configured to transmit to the network node 16 a CSI resource indicator, CRI, indicating the determined CSI-RS resulting in the highest spectrum efficiency of all the N CSI-RS.

According to this aspect, in some embodiments, the WD 22 further receives, via the radio interface 44, a signal configuring the WD 22 to determine the CSI-RS with the highest spectrum efficiency of all the N CSI-RS received in the signal from the network node 16. In some embodiments, each increment of the N incremented phase rotations are equal. In some embodiments, the N incremented phase rotations are achieved by multiplying, via the processing circuitry 48, a precoder codebook by a diagonal matrix whose diagonal elements are equal to one, except for one diagonal element corresponding to one of the four antennas and being equal to $\exp(j2\pi n/N)$, where n is an integer from zero to N−1.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

| Abbreviations | Explanation |
|---|---|
| AAS | Active Antenna System |
| CQI | Channel Quality Indicator |
| PDSCH | Physical Downlink Shared Channel |
| CSI-RS | Channel State Information Reference Signal |
| NZP-CSI-RS | Non-zero power CSI-RS |
| DFT | Discrete Fourier Transform |
| MU-MIMO | Multi-User MIMO |
| PMI | Precoding Matrix Indicator |
| RI | Rank Indication |
| SRS | Sounding Reference Signal |
| TTI | Transmission Time Interval |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method in a network node for compensation of phase error between antennas of a four-antenna dual-polarization antenna array of a radio of the network node, the method comprising:
applying N incremented phase rotations to one of the four antennas to produce N channel state information reference signal, CSI-RS, resources, N being an integer greater than 1, the N incremented phase rotations being obtained by multiplying a precoder codebook by a diagonal matrix whose diagonal elements are equal to one, except for one diagonal element corresponding to the one of the four antennas and being equal to exp (j2πn/N), where n is an integer from zero to N−1;
transmitting the N CSI-RS resources on 4 CSI-RS ports to a wireless device, WD, each of the N CSI-RS resources being transmitted with a different one of the incremented phase rotations;
receiving from the WD a CSI-RS resource indication, CRI, indicating a particular one of the N CSI-RS resources; and
applying, in subsequent transmissions to the WD, a phase rotation to the one of the four antennas, the phase rotation corresponding to the indicated CSI-RS resource.

2. The method of claim 1, wherein each of N increments of the N incremented phase rotations are equal.

3. The method of claim 1, wherein the particular one of the N CSI-RS resources is one having a highest spectrum efficiency of the N CSI-RS resources.

4. The method of claim 2, wherein the particular one of the N CSI-RS resources is one having a highest spectrum efficiency of the N CSI-RS resources.

5. A network node configured to compensate for phase error between antennas of a four-antenna dual-polarization antenna array of a radio of the network node, the network node comprising:
processing circuitry configured to apply N incremented phase rotations to one of the four antennas to produce N channel state information reference signal, CSI-RS, resources, N being an integer greater than 1, the N incremented phase rotations being obtained by multiplying a precoder codebook by a diagonal matrix whose diagonal elements are equal to one, except for one diagonal element corresponding to the one of the four antennas and being equal to exp(j2πn/N), where n is an integer from zero to N−1;
a radio interface in communication with the processing circuitry, the radio interface configured to:
transmit the N CSI-RS resources on 4 CSI-RS ports to a wireless device, WD, each of the N CSI-RS resources being transmitted with a different one of the incremented phase rotations; and
receive from the WD a CSI-RS resource indication, CRI, indicating a particular one of the N CSI-RS resources; and
the processing circuitry further configured to apply, in subsequent transmissions to the WD, a phase rotation to the one of the four antennas, the phase rotation corresponding to the indicated CSI-RS resource.

6. The network node of claim 5, wherein each of N increments of the N incremented phase rotations are equal.

7. The network node of claim 5, wherein the particular one of the N CSI-RS resources is one having a highest spectrum efficiency of the N CSI-RS resources.

8. A method in a wireless device, WD, the method comprising:
receiving a signal from a network node, the signal having N channel state information reference signals, CSI-RS, resources transmitted by a four-antenna dual polarization antenna array of a radio of the network node, the signal generated by the network node by applying N incremented phase rotations to one of the four antennas to produce N channel state information reference signal, CSI-RS, resources, N being an integer greater than 1, the N incremented phase rotations being obtained by multiplying a precoder codebook by a diagonal matrix whose diagonal elements are equal to one, except for one diagonal element corresponding to one of the four antennas and being equal to exp(j2πn/N), where n is an integer from zero to N−1;

determining a CSI-RS resource of the N CSI-RS resources resulting in a highest spectrum efficiency of all the N CSI-RS resources; and transmitting to the network node a CSI resource indicator, CRI, indicating the determined CSI-RS resulting in the highest spectrum efficiency of all the N CSI-RS resources.

9. The method of claim 8, wherein the WD further receives a signal configuring the WD to determine the CSI-RS resources with the highest spectrum efficiency of all the N CSI-RS resources received in the signal from the network node.

10. The method of claim 8, wherein each increment of the N incremented phase rotations are equal.

11. The method of claim 9, wherein each increment of the N incremented phase rotations are equal.

12. A wireless device, WD, the WD comprising:

a radio interface configured to receive a signal from a network node, the signal having N channel state information reference signals, CSI-RS, resources transmitted by a four-antenna dual polarization antenna array of a radio of the network node, the signal generated by the network node by applying N incremented phase rotations to one of the four antennas to produce N channel state information reference signal, CSI-RS, resources, N being an integer greater than 1, the N incremented phase rotations being obtained by multiplying a precoder codebook by a diagonal matrix whose diagonal elements are equal to one, except for one diagonal element corresponding to one of the four antennas and being equal to exp(j2πn/N), where n is an integer from zero to N−1;

processing circuitry in communication with the radio interface, the processing circuitry configured to determine a CSI-RS resource of the N CSI-RS resources resulting in a highest spectrum efficiency of all the N CSI-RS; and the radio interface further configured to transmit to the network node a CSI resource indicator, CRI, indicating the determined CSI-RS resource resulting in the highest spectrum efficiency of all the N CSI-RS resources.

13. The WD of claim 12, wherein the WD further receives a signal configuring the WD to determine the CSI-RS resource with the highest spectrum efficiency of all the N CSI-RS resources received in the signal from the network node.

14. The WD of claim 12, wherein each increment of the N incremented phase rotations are equal.

* * * * *